(12) United States Patent
Alastalo et al.

(10) Patent No.: US 7,323,525 B2
(45) Date of Patent: Jan. 29, 2008

(54) PROCESS FOR THE PRODUCTION OF PROPYLENE COPOLYMERS

(75) Inventors: Kauno Alastalo, Porvoo (FI); Päivi Pitkänen, Halkia (FI); Marita Sutela, Porvoo (FI); Lucas Pelckmans, Meerhout (BE); Harri Hokkanen, Häsalmi (FI)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/492,276

(22) PCT Filed: Oct. 2, 2002

(86) PCT No.: PCT/EP02/11092

§ 371 (c)(1),
(2), (4) Date: Aug. 30, 2004

(87) PCT Pub. No.: WO03/031486

PCT Pub. Date: Apr. 17, 2003

(65) Prior Publication Data

US 2005/0009957 A1    Jan. 13, 2005

(30) Foreign Application Priority Data

Oct. 9, 2001  (EP) .................................. 01124046

(51) Int. Cl.
*C08F 4/02*      (2006.01)
*C08F 4/642*    (2006.01)

(52) U.S. Cl. ................... 526/124.2; 526/348; 502/115; 502/156

(58) Field of Classification Search ................ 526/348, 526/124.2; 502/115, 156
See application file for complete search history.

*Primary Examiner*—Caixia Lu

(57) ABSTRACT

Polymers of propylene with one or two olefin comonomers are produced through the use of a polymerization catalyst supported on a carrier produced by spray crystallization and having a maximum dimension of 55 μm. Copolymers of superior properties are obtained, and the production process is de-snagged.

23 Claims, 1 Drawing Sheet

PROCESS FOR THE PRODUCTION OF PROPYLENE COPOLYMERS

Figure 1:
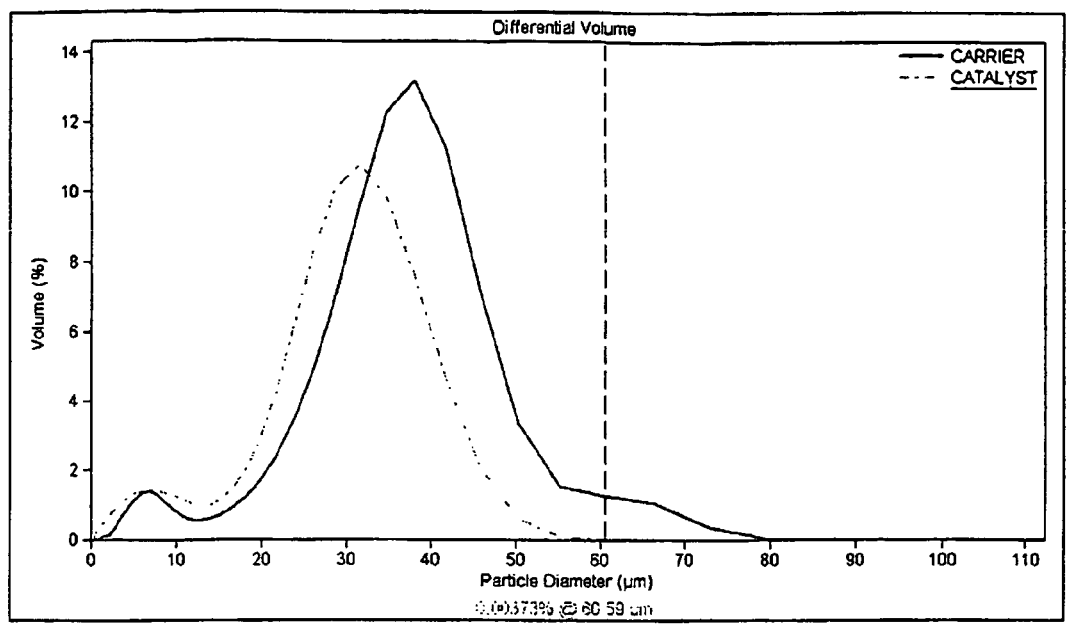

The present invention relates to the production of propylene polymers, in particular copolymers of propylene with one or two olefin comonomers. The copolymers are suitable for applications where good heat scalability and softness are required.

Polyolefins used in film applications as sealing layers should have low melting temperatures for good heat sealing performance. In polypropylene films, random copolymers having a relatively high content of comonomers, usually ethylene, are commonly used as such a sealing component. A high comonomer content is required for obtaining low melting temperatures. There are, however, problems associated with the process of production of random copolymers and terpolymers (i.e. propylene polymers with two comonomers), and with the end-properties of the materials themselves, because of their low melting temperature, in-process stickiness, and polymer solubility in the polymerisation medium. Further, catalyst activity increases significantly during copolymerisation, particularly in terpolymerisation, leading to undesirable growth in polymer particle size.

In comparison to homopolymer production, when a terpolymer or high comonomer content copolymer having a low melting temperature is to be produced in a slurry reactor, the solubles content of the polymer is high. Further, the comonomers used in the polymerisation, such as ethylene and/or butylene, cause swelling of the polymers in the polymerisation medium of the slurry reactor, resulting in excessively large and soft polymer particles. There is also a higher demand for external heat if it is desired to evaporate unreacted monomer by flashing after the slurry reactor, which may cause surface melting of polymer particles. If pressure in the flash vessel is reduced too much to improve monomer evaporation, flashing takes place too fast and the morphology of the particles is destroyed, causing problems downstream.

Because of the above-mentioned increased catalyst activity, product polymer particles can grow too rapidly and to too great a size, causing pipe plugging and product inhomogeneity and attrition. Moreover if a gas-phase reactor is employed, fluidisation efficiency and continuous take-out may be compromised. Further downstream problems may also arise in post-polymerisation procedures and units, such as catalyst deactivation, steaming and drying.

Polymerisation catalyst particle size is principally determined by the particle size of the carrier upon which catalytically active matter is supported. Such carriers can be produced by various processes such as spray crystallisation, spray-drying or emulsion processes. When, as is common, magnesium dichloride is used as carrier, the process is referred to as spray crystallisation. Typically a melt of $MgCl_2$ in a suitable quantity of a lower alcohol such as methanol is fed to a spray dryer operating at 150-200° C., whereupon the alcohol is flashed off and a dry magnesium chloride crystallite powder of quite broad particle size distribution is obtained.

The particle size extremes of the carrier powder range from 1 µm to 1.4 mm or even higher, the mass distribution between these limits following the usual bell curve. The powder is separated, according to standard practice, by screening to remove large particles, agglomerates and small particles. The intervening fraction is generally employed for catalyst manufacture, the large particles and agglomerates are usually recycled to melt preparation, and the small particles are discarded as being unusable.

Such a procedure is disclosed in WO-A-87/7620, in which a <74 µm fraction of small particles is separated by screening from a 10-300 µm spray-crystallised product. According to U.S. Pat. No. 5,100,849 both small and large particles are removed from the spray-crystallised product to yield a 45-212 µm intervening fraction as carrier product. EP-A-700,936 stresses the desirability of good catalyst shape and relatively large particle diameter, its carrier being the intervening fraction remaining after screening to remove <65 and >120 µm particles.

It has now been discovered that if, instead of the intervening material, the smallest-crystallite fraction is employed as carrier in catalyst manufacture, the aforesaid problems in the manufacture of propylene copolymers and terpolymers can be effectively avoided.

According to the present invention, therefore, a process for producing a copolymer of propylene with ethylene and/or a $C_4$ to $C_8$ α-olefin comprises contacting propylene and said ethylene and/or olefin under polymerisation conditions with an olefin polymerisation catalyst which includes a carrier, the carrier particles included in said catalyst being substantially free of particles having a minimum dimension greater than 55 µm. In the preferred practice of the invention, the copolymer is a propylene/ethylene/$C_4$-$C_8$ α-olefin terpolymer.

In a preferred embodiment the carrier is produced by spray crystallisation of a melt of a carrier precursor to yield a spray-crystallised product containing particles up to at least 500 µm in size.

Thus, following standard procedure, the catalyst carrier may, after its formation, be separated into a plurality of fractions, including one having a maximum particle dimension of 55 µm, by screening. The preferred carrier is magnesium dichloride, and a suitable melt for feed to the spray-crystallizer is represented by the formula:

in which R is $C_1C_6$ alkyl, ED is an electron donor, m=0–1 and n=1–6. The electron donor, ED, is preferably an aromatic carboxylic acid ester, particularly a dialkyl phthalate or maleate, most preferably di-2-ethyl hexyl phthalate.

It is not necessary that all ingredients of the final copolymer be present at the start of polymerisation. Production of the copolymer or terpolymer may be commenced by contacting propylene alone with the catalyst. Production of the terpolymer may be commenced by contacting propylene and ethylene and/or said α-olefin with the catalyst. The contacting may be performed in at least one slurry reactor and/or at least one gas phase reactor. In a preferred embodiment of the invention the contacting is performed in at least one slurry reactor and at least one gas phase reactor, the gas phase reactor or reactors being advantageously downstream of the slurry reactor or reactors.

When the copolymer is a terpolymer it preferably comprises 0.1 to 3 wt % of units derived from ethylene and 1 to 15 wt % of units derived from $C_4$-$C_8$ α-olefin, and the α-olefin of choice is butene.

The carrier of the polymerisation catalyst preferably has an average particle size of 15 to 45 µm. The olefin polymerisation catalyst itself is suitably a stereospecific-Ziegler-Natta catalyst system comprising a component containing Ti, Cl and Mg as essential components; a cocatalyst; and an external electron donor. The cocatalyst is preferably an organoaluminium compound, such as triethylaluminium, and the preferred electron donors are silane-based donors. Generally, the silane based donors have the formula (I)

$$R_nR'_mSi(R''O)_{4-n-m} \quad (I)$$

wherein

R and R' can be the same or different and stand for linear, branched or cyclic aliphatic or aromatic group;

R" is methyl or ethyl;

n is an integer 0 to 3;

m is n integer 0 to 3; and n+m is 1 to 3.

The aliphatic groups in the meanings of R and R' can be saturated or unsaturated.

Preferably, R and R' are linear $C_1$ to $C_{12}$ hydrocarbons which include methyl, ethyl, propyl, butyl, octyl and decanyl. As examples of suitable saturated branched $C_{1-8}$ alkyl groups, the following can be mentioned: isopropyl, isobutyl, isopentyl, tert.-butyl, tert.-amyl and neopentyl. Cyclic aliphatic groups containing 4 to 8 carbon atoms comprise, e.g. cyclopentyl, cyclohexyl, methylcyclopentyl and cycloheptyl.

Alternatively, the olefin polymerisation catalyst may be a single-site catalyst comprising a single-site/activator reaction product impregnated in the pores of the carrier.

The invention farther embraces the use of spray-crystallised $MgCl_2$ having an average particle size below 55 µm as carrier for a polymerisation catalyst in the production of propylene copolymers or terpolymers.

It is particularly preferred to produce the material in a combination of one or more slurry polymerisation reactor(s) and one or more gas phase reactor(s). Thereby, the comonomer conversion can be increased, and comonomer distribution can be optimised and tailored. However it is possible to employ a slurry-slurry (preferably loop-loop) system; or two gas phase reactors; or any combination thereof. It is known (the so-called "replication effect") that the physical structure of the polymerisation catalyst carrier is reproduced in the overall catalyst composition, and eventually in the particulate polymer product itself. In the process according to the invention, therefore, the use of the small particle size catalyst leads to the formation of a correspondingly small particle size product. This is particularly advantageous because of the concomitant reduction in production of large particles which, through breakdown, are normally the principal source of undesired product fines.

A favoured procedure for terpolymer production thus comprises:

a) feeding into a slurry reactor a mixture containing 50 to 85 wt % of propylene, 0.1 to 10 wt % of ethylene, 3 to 40 wt % of another α-olefin, a catalyst system capable of achieving olefin polymerisation at said temperature conditions, and optionally hydrogen, b) polymerising said reaction mixture at a temperature of less than 70° C. for a sufficient time to obtain a propylene terpolymer amounting to 50 to 99.5 wt % of the end product, c) transferring said reaction mixture into a gas phase reactor operating at a pressure higher than 5 bar, preferably higher than 10 bar, and optionally adding 0 to 10 wt % of ethylene, 0 to 10 wt % of another α-olefin, 0 to 40 wt % of propylene, of said transferred mixture, and
optionally hydrogen, and d) continuing polymerisation in said gas phase reactor for obtaining a propylene terpolymer amounting to 0.5 to 50 wt % of the end product, Preferably a bulk loop reactor is used as slurry reactor, and the slurry phase may be carried out in two slurry reactors, preferably but not necessarily in two loop reactors. When continuing the polymerisation in a gas phase reactor or reactors, the comonomer distribution can be easily controlled and comonomer content can be increased further. Thus, the final polymer properties can be tailored by adjusting comonomer ratios in different reactors.

In a typical terpolymer production, a polymerisation catalyst system and monomer mixture is fed into a slurry reactor. Propylene acts as a monomer and a diluent in the reaction mixture. The $C_4$-$C_8$ α-olefin can be 1-butene, 1-pentene, 4-methyl-1-pentene, 1-hexene, 1-heptene or 1-octene.

In the first slurry step a terpolymer is produced, in which the content of ethylene monomer is in the range of 1 to 4 wt %, preferably less than 3 wt %. The $C_4$-$C_8$ olefin content in the product will be in the range of 5 to 12 wt %. Hydrogen is added, when desired. The temperature in the slurry reactor is preferably below 70° C.

In the gas phase reactor ("GPR"), 0.5 to 50 wt %, preferably 0.5 to 30 wt % of the final end product is formed. The polymerisation can be carried out at a temperature of 60 to 90° C. and at a pressure higher than 5 bar, preferably higher than 10 bar. Propylene and other monomers can be added, but not necessarily, into the gas phase reactor. Hydrogen can be added also into the gas phase reactor, when desired.

Terpolymers of propylene are obtained in which the ethylene content is generally 0.1 to 10 wt % and the content of other α-olefins is 1 to 25 wt %. These products have low melting point and thus they can be used for applications such as heat-sealable sheets and films, when softness is required. Products having low stiffness can be used in applications like moulded sheets, lids, bottles and fibres. It is preferred to produce terpolymers containing less than 3 wt % units (e.g. 0.3 to 3 wt %) derived from ethylene and less than 15 wt % (e.g. 1 to 15 wt %) of the other units of α-olefins.

The catalyst used in such an operation, whether directed to production of terpolymer or of a propylene/$C_4$-$C_8$ α-olefin copolymer, may be of the Ziegler-Natta or of the single-site kind, supported on the prescribed carrier.

Ziegler-Natta catalysts typically comprise the reaction product of a Gp IVB metal halide with a magnesium/electron donor complex. They are usually synthesised by reacting a dialkyl magnesium with a polyhydric alcohol and with a carboxylic acid dihalide to produce the complex; and reacting the so-produced complex with a titanium tetrahalide to produce a solution of the desired Ti/Mg/electron-donor catalyst component. This component is then recovered from its solution, usually by precipitation through the use of aliphatic and/or aromatic hydrocarbon precipitating agents, and subjected to conventional washing and drying. Alternative means of recovering it include simple evaporative removal of solvent; and its isolation as the dispersed phase of an emulsion, followed by solidification (suitably by heating) and recovery by filtration or decantation.

The carrier may be introduced into this sequence of operations at any stage, provided that efficient uptake of the final catalyst component will result. Preferably it is added to the solution of Ti/Mg/electron donor component, or to either of the reagents (complex or titanium halide) which are combined to produce it. However it may be added to that component after its recovery from its solution. When that component constitutes the dispersed phase of an emulsion, the emulsion is preferably caused to form in the presence of the carrier, so that the component forms in situ in the carrier's interstices.

It is possible to introduce the carrier into the synthesis at an earlier stage, for instance during or immediately after the formation of the magnesium/electron donor complex, provided that the nature of the materials employed permits the efficient progress in the carrier's interstices of the subsequent reactions which are to occur.

The following examples illustrate the present invention. In them:

Melt Flow rates were measured with a load of 2.16 kg and at 230° C. according to ISO 1133.

Comonomer contents (ethylene and butene) were measured with Fourier transform infrared spectroscopy (FTIR) calibrated with NMR.

Determination of xylene soluble fraction (XS) 2.0 g of polymer is dissolved in 250 ml p-xylene at 135° C. under agitation. After 30±2 minutes the solution is allowed to cool for 15 minutes at ambient temperature and then allowed to settle for 30 minutes at 25±0.5° C. The solution is filtered with filter paper into, two 100 ml flasks.

The solution from the first 100 ml vessel is evaporated in nitrogen flow and the residue is dried under vacuum at 90° C. until constant weight is reached.

The xylene soluble fraction is calculated using the following equation:

$$XS\% = (100 \times m_1 \times v_0)/(m_0 \times v_1),$$

wherein $m_0$=initial polymer amount (g)
$m_1$=weight of residue (g)
$v_0$=initial volume (ml)
$V_1$=volume of analysed sample (ml)

EXAMPLE

Carrier Preparation:

An $MgCl_2(C_2H_5OH)_n$ melt (at 115° C.) was top-fed into a spray crystallisation chamber through an atomiser wheel to form droplets. An inert gas, nitrogen, was fed in two parts: from the top and from the middle part of the chamber, at respective temperatures 64° C. and −21° C. Solidified carrier particles fell to the bottom of the chamber on a 53 μm screen. The retained material was discarded, and the material passing the screen employed as carrier in catalyst synthesis.

Catalyst Synthesis:

A highly active polypropylene polymerisation catalyst of Ziegler-Natta type was prepared in the following manner. 1100 kg of $TiCl_4$ was fed to a reactor and cooled to −20° C. 77 kg of the carrier was suspended in 223 kg aliphatic hydrocarbon solvent (bp 90°-110° C.) and cooled before adding it to the cold $TiCl_4$. Controlled heating to 130° C. was performed. During heating di-2-ethyl hexyl phtalate (DOP) was added, and transesterification (DOP→DEP, diethyl phtalate) effected by keeping the mixture for 30 minutes at 130° C. The solid was separated by filtration. The procedure was repeated 3 times, each repeat adding the $TiCl_4$ to the filtered solid recovered from the previous titanation. The catalyst, resulting from the third repeat, washed 4 times with the aliphatic hydrocarbon solvent and dried in vacuum to free flowing powder.

Table 1 and FIG. 1 show the particle distribution size of the carrier and of the catalyst as produced above.

Polymerisation:

A combination of a loop reactor and a gas phase reactor was used to produce propylene terpolymers for films. Propylene, ethylene, butene and hydrogen were fed into the loop reactor. The polymer slurry produced in the loop reactor, along with unreacted monomers and hydrogen, was passed directly into the gas phase reactor and polymerisation was completed therein.

The external electron donor used was dicyclopentyl dimethoxy silane and the activator (cocatalyst) was triethylaluminium.

TABLE 1

| Sample | Carrier | Catalyst |
|--------|---------|----------|
| Mean   | 26      | 17       |
| D10    | 7       | 4        |
| D50    | 33      | 26       |
| D90    | 46      | 39       |

The polymerisation conditions and product composition are summarised in Table 3.

Comparative Example

Example 1 was repeated, except that the carrier employed for catalyst synthesis was that passed by a 125 μm screen and retained by a 53 μm screen.

Figure 2:
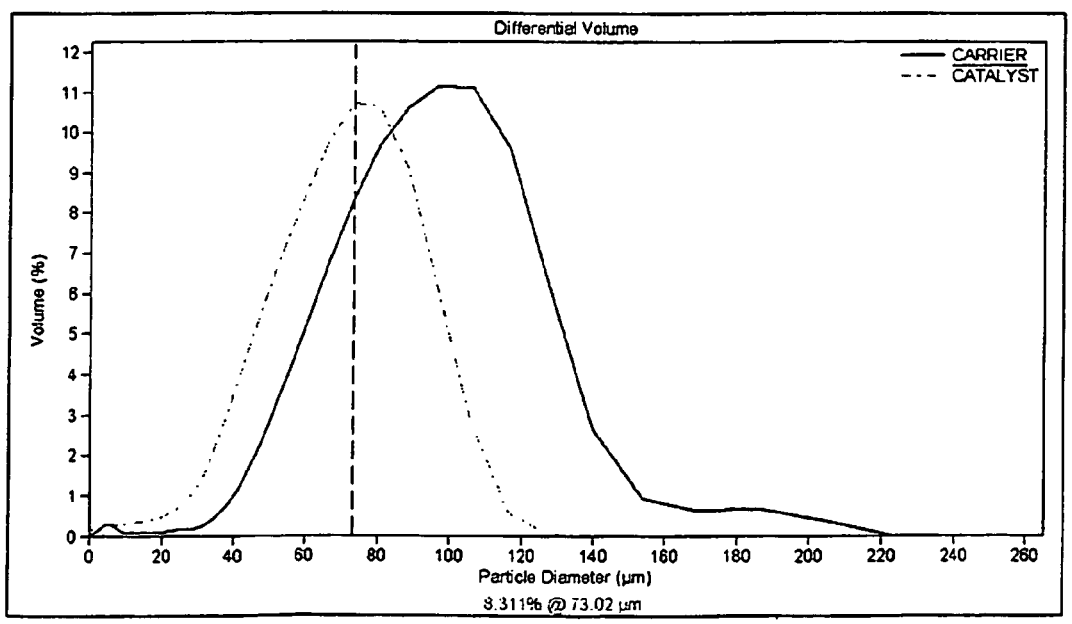

Table 2 and FIG. 2 show the particle size distribution of the carrier and of the titanized catalyst product obtained from it.

TABLE 2

| Sample | Carrier | Catalyst |
|--------|---------|----------|
| Mean   | 75      | 49       |
| D10    | 49      | 23       |
| D50    | 87      | 63       |
| D90    | 124     | 92       |

As shown in Table 3 (below), the polymerisation conditions and product composition were essentially the same in the Comparative Example as in the Example of the invention.

TABLE 3

|                     | Example | Comparative Example |
|---------------------|---------|---------------------|
| Al:DOP              | 5       | 5                   |
| Al:Ti (wt ratio)    | 300     | 250                 |
| Loop Temp ° C.      | 63      | 64                  |
| Productivity in loop| 90%     | 95%                 |
| GPR temp            | 75      | 77                  |
| GPR pressure        | 16      | 16                  |
| GPR productivity    | 10%     | 5%                  |
| Final polymer       |         |                     |
| Ethylene wt %       | 1.5     | 1.5                 |
| 1-butene wt %       | 6.7     | 6.4                 |
| XS wt %             | 6.5     | 5.6                 |
| MFR of pellets      | 6.6     | 6.0                 |

However as shown in Table 4 (below) there were major difference in the respective polymer products' particle size distribution (screening method).

TABLE 4

| Screen (mm) | Polymer Ex (wt %) | Polymer Comp Ex (wt %) |
|---|---|---|
| 4.00 | 0.1 | 0.3 |
| 3.35 | 0.2 | 0.5 |
| 2.36 | 0.5 | 11.6 |
| 1.70 | 14.7 | 32.6 |
| 1.00 | 65.9 | 39.3 |
| 0.50 | 17.1 | 11.9 |
| 0.15 | 1.3 | 3.3 |
| 0.06 | 0.0 | 0.2 |
| 0 (pan) | 0.2 | 0.3 |

It will be observed that the polymerisation according to the invention resulted in a product heavily (two-thirds) concentrated about the ideal particle size of 1 mm, and essentially free of >2.3 mm matter, with only 15.5% of particles >1.7 mm. By contrast the comparative product was diffusely spread over the size range 0.5-2.36 mm, with a significant quantity of >2.3 mm particles (12.4%) present and 45% over 1,7 mm. Additionally the amount of fine particles (size range <0.5 mm) is 1.5 wt % according to the invention, versus 3,8 wt % in the comparative example, indicating breakage of particles. It is surprising that the replication effect manifests itself so much more strongly in the inventive process than in the comparative.

Moreover, the production according to the Comparative Example showed critical process disturbances. The pipe between loop and GPR was fouled, and gradually plugged. The catalyst deactivation and dryer (after polymerisation reactors) showed pressure disturbances leading to production shutdown. The polymer had a strong smell of 1-butene.

In the inventive Example the production went smoothly, without any disturbances. When the catalyst was changed from that of the Comparative Example to that of the inventive Example, the fluidisation in the dryer restored itself. As the polymer is very sticky, due to the low sealing temperature, continuous fluidisation is essential to prevent lump formation which can easily plug outlet values and lines. When this happens, a shutdown is inevitable.

The invention claimed is:

1. A process for producing a copolymer of propylene with ethylene and/or a $C_4$ to $C_8$ α-olefin comprising:
    spray-crystallizing a melt of a carrier precursor to yield a product of carrier particles;
    selecting from said product a fraction of the carrier particles, said fraction being substantially free of particles having a minimum dimension greater than 55μm; and
    contacting said propylene and said ethylene and/or olefin under polymerisation conditions with an olefin polymerisation catalyst which includes the fraction.

2. A process according to claim 1, wherein said copolymer comprises less than about 1.5% by weight of particles having a size of less than 0.5 mm.

3. A process according to claim 1 comprising contacting propylene, said olefin, and ethylene with said catalyst, and wherein said copolymer is a propylene/ethylene/$C_4$-$C_8$ α-olefin terpolymer.

4. A process according to claim 1 wherein said spray-crystallised product is, after its formation, separated into a plurality of fractions, including one having a maximum particle dimension of 55 μm, by screening.

5. A process according to claim 1 wherein said carrier is magnesium dichloride.

6. A process according to claim 1 wherein said melt is represented by the formula:

$$MgCl_2.nROH.mED$$

in which R is $C_1$-$C_6$ alkyl, ED is an electron donor, m=0–1 and n=1–6.

7. A process according to claim 6 wherein ED is an aromatic carboxylic acid ester.

8. A process according to claim 7 wherein ED is a dialkyl phthalate or maleate.

9. A process according to claim 1 wherein production of the copolymer or terpolymer is commenced by contacting propylene alone with said catalyst.

10. A process according to claim 3 wherein production of said terpolymer is commenced by contacting propylene and either ethylene or said α-olefin with said catalyst.

11. A process according to claim 1 wherein said contacting is performed in at least one slurry reactor.

12. A process according to claim 1 wherein said contacting is performed in at least one gas phase reactor.

13. A process according to claim 1 wherein said contacting is performed in at least one slurry reactor and at least one gas phase reactor.

14. A process according to claim 13 wherein the gas phase reactor or reactors are downstream of the slurry reactor or reactors.

15. A process according to claim 14 wherein the slurry and gas phase reactors are arranged in cascade.

16. A process according to claim 3 wherein the terpolymer comprises 0.1 to 3 wt % of units derived from ethylene and 1 to 15 wt % of units derived from $C_4$-$C_8$ α-olefin.

17. A process according to claim 1 wherein the α-olefin is butene.

18. A process according to claim 1 wherein the carrier of said polymerisation catalyst has an average particle size of 15 to 45 μm.

19. A process according to claim 1 wherein the olefin polymerisation catalyst system comprises a stereospecific Ziegler-Natta catalyst comprising as essential components Ti, Cl and Mg.

20. A process according to claim 19 wherein said catalyst-system comprises an external electron donor and a cocatalyst.

21. A process according to claim 20 wherein said cocatalyst is an organoaluminium compound and said electron donor is a silane-based donor.

22. A process according to claim 1 wherein the olefin polymerisation catalyst is a single site catalyst comprising a single site/activator reaction product impregnated in the pores of said carrier.

23. A process according to claim 1 utilizing spray-crystallised $MgCl_2$ having an average particle size below 55 μm as carrier for a polymerisation catalyst in the production of propylene copolymers or terpolymers.

* * * * *